United States Patent [19]

Kruskopf

[11] 4,203,091

[45] May 13, 1980

[54] SEQUENTIALLY ACTUATED FLASHING LIGHT APPARATUS

[75] Inventor: Hans G. Kruskopf, Åkersberga, Sweden

[73] Assignee: Mats Holersson Fridmark, Alvsjo, Sweden

[21] Appl. No.: 880,271

[22] Filed: Feb. 22, 1978

[51] Int. Cl.[2] .......... G03B 5/38; H05B 39/09

[52] U.S. Cl. .......... 340/331; 340/28; 340/114 B

[58] Field of Search .......... 340/331, 345, 332, 28, 340/29, 26, 114 R, 114 B; 343/225, 228; 315/133, 136

[56] References Cited

U.S. PATENT DOCUMENTS

| | | | |
|---|---|---|---|
| 2,797,367 | 6/1957 | Scott et al. | 340/26 |
| 3,488,558 | 1/1970 | Grafton | 340/26 |
| 3,519,984 | 7/1970 | Zychal | 340/331 |
| 3,781,853 | 12/1973 | Jacobs | 340/29 |
| 3,787,867 | 1/1974 | Dodge et al. | 340/29 |
| 3,846,672 | 11/1974 | Doughty | 340/114 B |
| 3,938,080 | 2/1976 | Hulme | 340/114 B |
| 4,024,491 | 5/1977 | Pellerin et al. | 340/29 |

*Primary Examiner*—John W. Caldwell, Sr.
*Assistant Examiner*—James J. Groody
*Attorney, Agent, or Firm*—Burns, Doane, Swecker & Mathis

[57] ABSTRACT

The present invention relates to a flashing light apparatus comprising a plurality of flashing light units, connected in series, wherein each unit is arranged to produce a short flash in a predetermined time slot. The time slots allotted to a plurality of these units are so choosen that the first unit is first activated, and after a predetermined time, or immediately thereafter, the second unit is then activated, etc. This arrangement gives the impression of a "travelling flash". Each flashing light unit has its own oscillator, to control the time delay between adjacent time slots, a control circuit, to activate a switching device, and a monostable multivibrator, adapted to produce output pulses of a definite duration. The units may be connected in series, parallel or branched and the first unit serves as a "master unit" while the other units act as "slave units". When a the connecting link between two slave units is broken, one of the slave units automatically becomes a master unit.

8 Claims, 3 Drawing Figures

SEQUENTIALLY ACTUATED FLASHING LIGHT APPARATUS

FIELD OF THE PRESENT INVENTION

The present invention relates to a flashing light apparatus, and especially to that kind of apparatus which comprises a plurality of flashing light units. These units may be connected in series, parallel or branched. Each unit is arranged to give a short flash in a predetermined time slot. All time slots allotted to a plurality of these units are so choosen that the first unit is first activated, and after a predetermined time period or immediately thereafter, the second unit is activated, etc. The generated flashing lights from all units in a chain thus give the impression of a "travelling flash". Such a flashing light apparatus may be used for traffic purposes to give the road user a visual indication of how a working site in the road can be passed, in the ship yard as an indication of the emergency exit, etc.

BRIEF DESCRIPTION OF THE PRIOR ART

Previously known in the art are a large number of different flashing light apparatuses and among those having the features mentioned above it is common to have one master unit and a plurality of slave units connected thereto. The master unit is usually constructed in a complicated manner while the slave units are more simply constructed. The master unit generates a plurality of time separated control pulses, one for each slave unit, in order to activate each slave unit within its own time slot. Such an arrangement has the disadvantage that a cable breakdown close to the master unit causes the whole apparatus to become inactive. Further it is common to arrange the power supply to all slave units through the master unit, and a breakdown in the power supply will surely cause the apparatus to become inactive.

OBJECTS OF PRESENT INVENTION

The main object of the present invention is to provide a flashing light apparatus in which all flashing light units are equally constructed, which means that the master unit is identical to the slave unit. This object will reduce the production cost and simplify the storage system.

A second object of the present invention is to provide a flashing light apparatus in which each and every flashing light unit has its own power supply.

This object has the advantage that a cable breakdown anywhere along the line of a chain of flashing light units allotts automatically one slave unit to become a master unit, and the complete flashing light apparatus is still operative.

A further object of the present invention is to provide a flashing light unit having an interior power supply, an oscillator, a control circuit, a switching means, a monostable multivibrator and a flashing light generating means.

BRIEF DESCRIPTION OF THE ACCOMPANYING DRAWING

So that further objects and advantages related to this invention will appear, a preferred embodiment, having the novel features of the present invention, will be described with reference to and illustrated in the accompanying drawing in which FIG. 1 shows partially in block a circuit a flashing light unit, a plurality of which form the flashing light apparatus, FIG. 2 shows three units according to FIG. 1 connected in series and thus forming the flashing light apparatus and FIG. 3 shows a circuit diagram of the block control circuit shown in FIG. 1.

DESCRIPTION OF A PREFERRED EMBODIMENT

The present invention relates to a flashing light apparatus, and especially to that kind of apparatus which comprises of a plurality of flashing light units. These units may be connected in series, parallel or branched. Eacht unit is arranged to give a short flash in a predetermined time slot. All time slots allotted to a plurality of these units are so choosen that the first unit is first activated, and after a predetermined time period or immediately thereafter, the second unit is activated, etc. The generated flashing lights from a chain of units give the impression of a "travelling flash". Such a flashing light apparatus may be used for traffic purposes, to give the road user a visual indication of how a working site in the road can be passed, in the ship yard as an indication of the emergency exit, etc.

Figure 1:
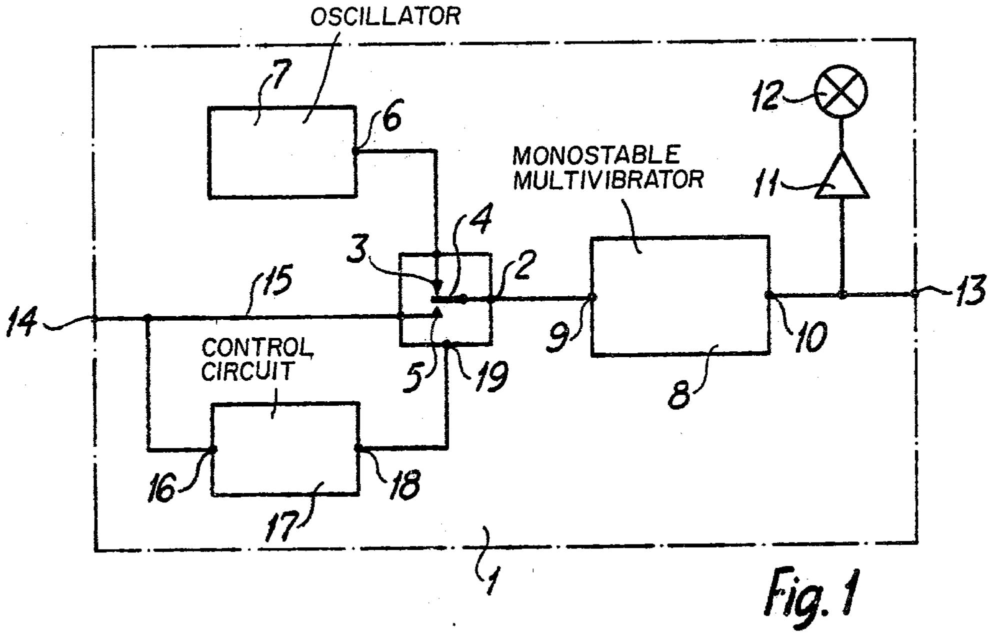

In FIG. 1 is shown partially in block diagram a preferred circuit used in the flashing light unit and the dashed frame encircles an individual unit 1. Each flashing light unit 1 contains a gate or a switching means 2, capable of being switched into one of two positions. The first position (an uninfluenced state) is defined by a connection between the fixed contact 3 and the movable contact 4, and the other position (influenced by a control signal) is defined by a connection between the fixed contact 5 and the movable contact 4. The gate 2 consists preferably of a semiconductive switching arrangement. Fixed contact 3 of the gate 2 is connected to the output terminal 6 from a free running oscillator 7 which is arranged, for example, to give an output pulse every other second. This output pulse is fed, when the gate 2 is switched into its first position, to the input terminal 9 of a monostable multivibrator 8. The monostable multivibrator generates, at its output terminal 10, pulses with a definite duration, for example a duration of 0.3 sec. and with a repetition frequency equal to that of the oscillator. The signal occuring on output terminal 10 is connected to an amplifier 11 which activates a light bulb 12, which gives a flash during the time of the pulse duration. The signal from the multivibrator 8 is also connected to an output terminal 13 for the flashing light unit 1, from which the signal, as described later, can be connected to an adjacent flashing light unit in the chain. (See FIG. 2).

Each flashing light unit is also provided with an input terminal 14. The input terminal 14 and the output terminal 13 may have the form of connecting means arranged onto the cover of the unit. The input terminal 14 is connected by a cable 15 to the fixed contact 5 of the gate 2 and an external signal, which occurs at the terminal 14, will thus be connected to the fixed contact 5. The external signal to the input terminal 14 is also fed via a cable 16 to a control circuit 17 which is arranged to receive the signal and further to send it, via its own output terminal 18, to the gate 2 as a switch-over signal. This signal is connected to input terminal 19 for the gate 2. As soon as the gate 2 receives this switch-over signal, the movable contact 4 is switched over so that a path is formed between the fixed contact 5 and the movable contact 4 to the multivibrator 8. The connection to the oscillator 7 is thus broken. The control circuit 17 is arranged to delay the pulse on the output terminal 18 in proportion to that appearing on the input terminal 14 and to keep the gate 2 in its switched over position, for example during 4 seconds, if one single moving flash of light is desired.

If a series of moving flashes of lights is desired the delay time for the gate 2 must be at least equal to the time between two flashes by the master unit, that is the first unit in the chain. The delay time between incoming and outgoing signals in the control circuit is adjustable and dependent upon how the flashes are to be produced by each unit. A necessary delay is obtained if the monostabile multivibrator 8 is triggered by the trailing edge of a square wave pulse and the control circuit 17 is triggered by the leading edge of the pulse. It is evident that the leading edge and the trailing edge of the pulse are received at the output terminal 13.

Figure 2:
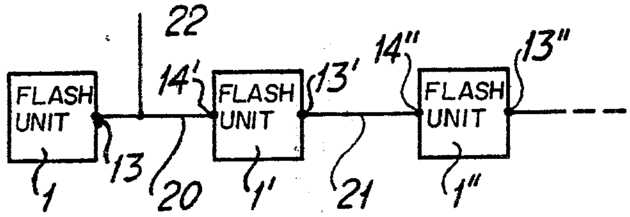

FIG. 2 shows a chain with only three flashing light units of the above described type, which are given the reference numerals 1, 1' and 1" respectively. The flashing light unit 1 has its output terminal 13 from its multivibrator 8 connected, via a cable 20, to the input terminal 14' of an adjacent flashing light unit 1', and this flashing light unit has its output terminal 13' connected, via a cable 21, to the input terminal 14" of the adjacent flashing light unit 1". The flashing light unit 1 has its gate 2 unactivated, since a signal is not being fed to its input terminal (14 in FIG. 1) and thus its oscillator 7 will continuously send signals via its gate 2 to its multivibrator 8, which partly produces flashing of its lamp 12 and partly sends an output signal to activate the input terminal 14" of the following flashing light unit 1'. The flashing light unit 1' will thus have its gate 2 in the second position, and the signal trigging this flashing light unit 1' is the signal generated by oscillator 7 and reshaped in multivibrator 8 in the flashing light unit 1. The same is valid for all further flashing light units in the chain, for example the flashing light unit 1". Through the mentioned signal delay in circuit 17 or utilization of leading and trailing edges of the signals, the different lamps will cause a flash as soon as the adjacent lamp has gone out and a moving flash of light is provided along the chain.

Since all flashing light units are identical, any flashing light unit can form a controlling master unit for the following flashing light units, which automatically have their oscillators switched off and thus form slave units.

The current supply is not shown in the illustrated embodiment in the drawing, but can be achieved either through interior batteries in every flashing light unit or from an exterior current source, in which the connection of flashing light units to a chain is done by a three wired cable, wherein two wires make a current feeding wire and one wire makes a signal transporting wire.

A master light unit, for example, the unit 1 in FIG. 2 can also control side chains, which is indicated by the wire 22. If a chain would be damaged and for example the wire 20 in FIG. 2 would be exposed to an interruption in the signal wire, the flashing light unit 1' will become a master unit for all the following light units and the first light unit 1 in the chain will blink or flash independently of the other light units, and the desired function is essentially maintained. The lamp 12 is preferably made by a conventional bulb, but can also consist of, for example, a discharge lamp.

It should be noted that the multivibrator 8 may be a bistable multivibrator or a monostable multivibrator. The oscillator 7 may be free running or may be controlled.

Figure 3:
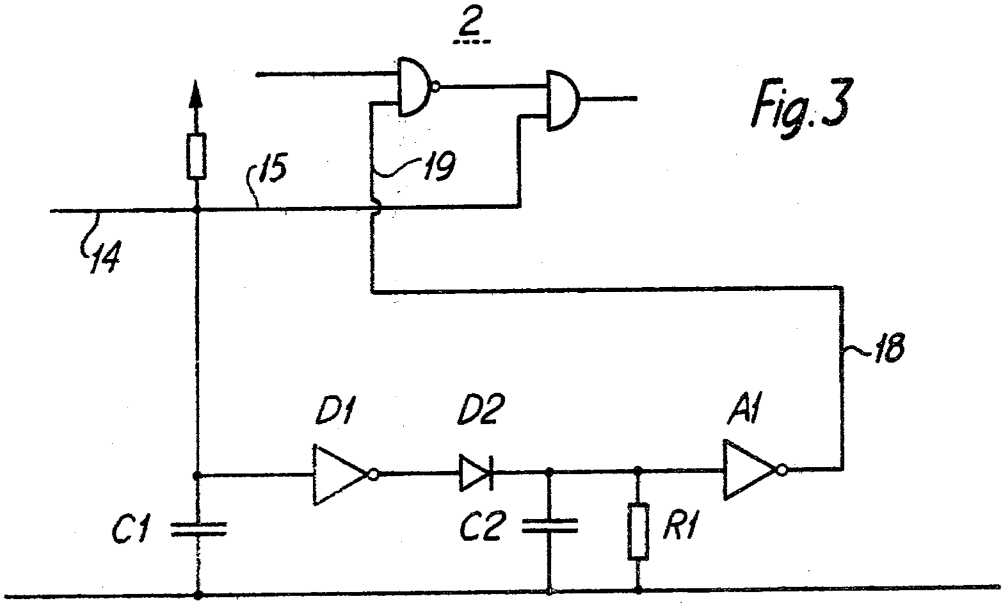

FIG. 3 shows an arrangement of the controlling circuit 17 in FIG. 1.

The input signal on line 14 is connected to a capacitance C1. The signal is inverted in an inverting device D1, and fed through a diode D2. A capacitance C2 and a resistance R1 form the input delay for the amplifier A1, the output of which is connected to the gate arrangement 2.

The invention is not restricted to the shown embodiment but may be modified within the scope of the succeeding claims.

What is claimed is:

1. A flashing light apparatus including a plurality of flashing light units forming a chain of light units in which each light unit produces a flash of light in a predetermined time slot different from the time slot associated with adjacent light units in the chain, wherein each light unit comprises:

- an input terminal for receiving control signals from a preceding light unit in the chain of light units;
- an oscillator for producing pulses at a predetermined rate;
- a multivibrator circuit for producing output signals;
- switching means for selectively connecting said multivibrator to receive pulses from said oscillator in a first mode and control signals from said input terminal in a second mode;
- control circuit means responsive to the signals at said input terminal for controlling the operation of said switching means;
- flashing means responsive to an output signal from said multivibrator to produce a flash of light; and
- an output terminal adapted to provide output signals from said multivibrator circuit as control signals to a subsequent light unit in the chain.

2. A flashing light apparatus according to claim 1, wherein said multivibrator is a monostable multivibrator.

3. A flashing light apparatus according to claim 1, wherein one of said units serves as a master unit when its switching means is in its first mode.

4. A flashing light apparatus according to claim 1, wherein one of said units serves as a slave unit when its switching means is in its second mode.

5. A flashing light apparatus according to claim 1, wherein a signal to said input terminal activates the control circuit means to cause the switching means to change from its first mode to its second mode.

6. A flashing light apparatus according to claim 1, wherein the output terminal of the multivibrator generates a signal, which via an amplifier is activating the flashing means.

7. A flashing light apparatus according to claim 6, wherein the flashing means is a lamp.

8. A flashing light apparatus according to claim 1 or 2, wherein the multivibrator circuit is arranged to give its output signal in dependence upon the trailing edge of a square pulse received through the switching means and the control circuit means is arranged to feed a signal to the switching means by the reception of the leading edge of a pulse received from a multivibrator related to a preceding flashing light unit.

* * * * *